9148X
Burgess & Baldwin.
Thrashing Mach.
Patented Oct. 10, 1835.
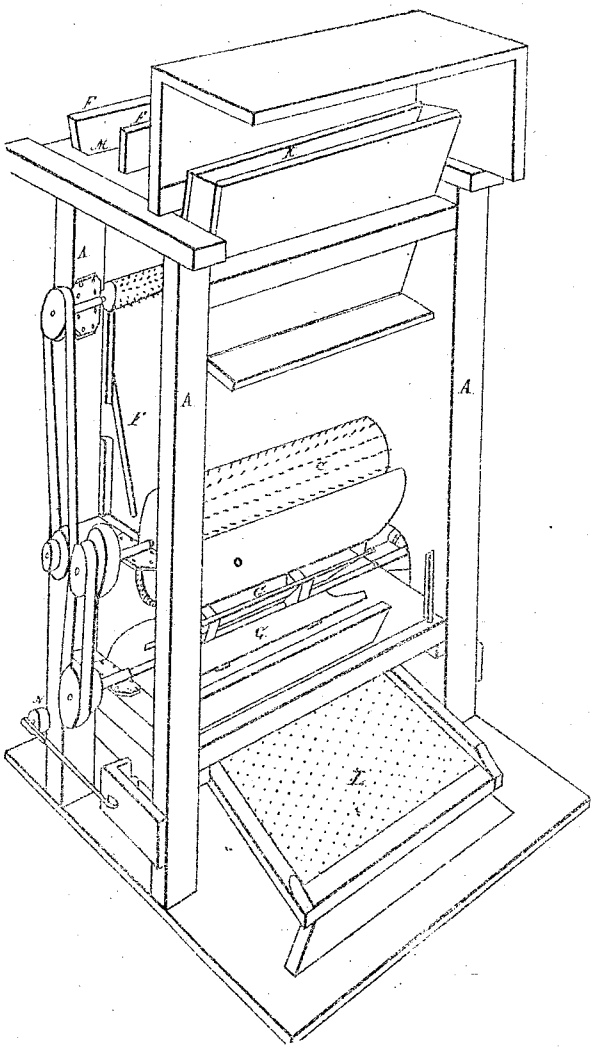
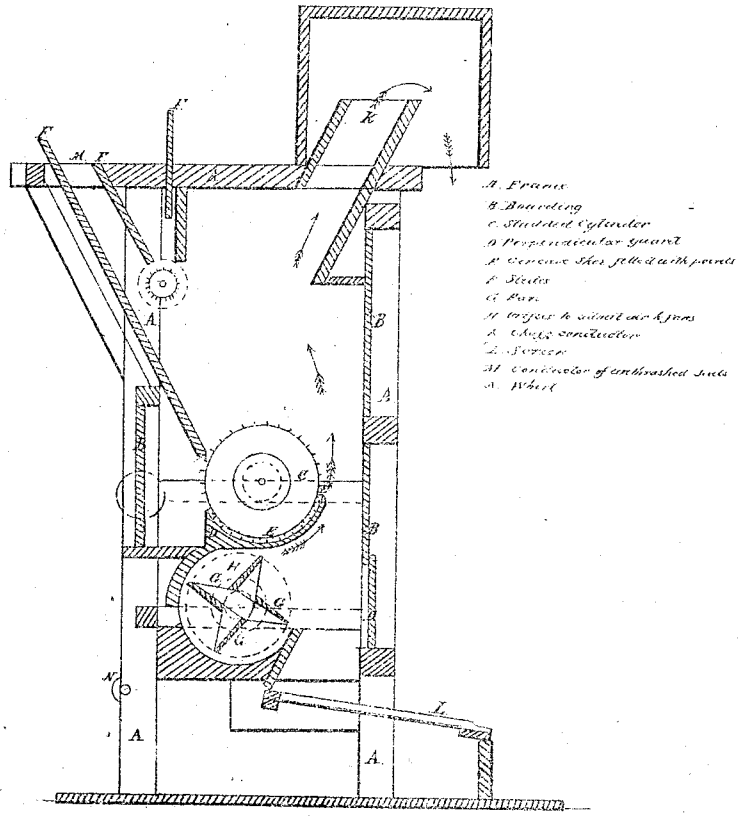

MISSING PAGE TEMPORARY NOTICE

PATENT # 9148X FOR ISSUE DATE 10-10-1835
HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text